United States Patent
Myung et al.

(10) Patent No.: US 12,496,181 B2
(45) Date of Patent: Dec. 16, 2025

(54) METHOD OF MANUFACTURING COVERED STENT AND COVERED STENT MANUFACTURED THEREBY

(71) Applicant: BCM Co., Ltd., Gyeonggi-do (KR)

(72) Inventors: Byung Cheol Myung, Gyeonggi-do (KR); Houn Sung Kim, Gyeonggi-do (KR)

(73) Assignee: BCM Co., Ltd., Gyeonggi-do (KR)

( * ) Notice: Subject to any disclaimer, the term of this patent is extended or adjusted under 35 U.S.C. 154(b) by 461 days.

(21) Appl. No.: 17/394,303

(22) Filed: Aug. 4, 2021

(65) Prior Publication Data

US 2022/0371259 A1    Nov. 24, 2022

(30) Foreign Application Priority Data

May 18, 2021   (KR) .................. KR10-2021-0064307

(51) Int. Cl.
| | | |
|---|---|---|
| *A61F 2/07* | (2013.01) | |
| *A61F 2/82* | (2013.01) | |
| *A61L 31/10* | (2006.01) | |
| *B29C 53/56* | (2006.01) | |
| *B29C 53/80* | (2006.01) | |
| *B29K 27/18* | (2006.01) | |
| *B29L 31/00* | (2006.01) | |

(52) U.S. Cl.
CPC .................. *A61F 2/07* (2013.01); *A61F 2/82* (2013.01); *A61L 31/10* (2013.01); *B29C 53/566* (2013.01);
(Continued)

(58) Field of Classification Search
CPC ........ A61F 2002/072; A61F 2250/0039; A61F 2/82; A61F 2/07; A61F 2220/0075;
(Continued)

(56) References Cited

U.S. PATENT DOCUMENTS 5,078,726 A * 1/1992 Kreamer .................... A61F 2/07
                                                      623/1.13
5,700,285 A * 12/1997 Myers ........................ A61F 2/07
                                                      606/198
(Continued)

FOREIGN PATENT DOCUMENTS

JP    2007-505687 A    3/2007
JP    2011-240120 A    12/2011
(Continued)

OTHER PUBLICATIONS

Office Action for U.S. Appl. No. 17/394,303 issued by the USPTO on Sep. 6, 2024.

*Primary Examiner* — Brian E Pellegrino
(74) *Attorney, Agent, or Firm* — IP & T GROUP LLP

(57) ABSTRACT

A method of manufacturing a covered stent is disclosed. The method includes winding a first PTFE tape around a cylinder body of a jig, winding a second PTFE tape around a stent including the jig fitted therein, heating the stent in an oven, fitting the stent into upper and lower elastic members, fitting the elastic members into a mold, pressing the upper elastic member to bond the PTFE tapes to each other and to thus form a first film at a cylindrical body of the stent, taking the elastic members out of the mold, taking the stent out of the elastic members, removing the jig from the stent, forming a silicone coating layer at an expansion portion of the stent, and sewing the spaces in the expansion portion, the second PTFE tape, and the silicone coating layer to form a second film at the expansion portion.

11 Claims, 14 Drawing Sheets

(52) U.S. Cl.
CPC ........ *B29C 53/80* (2013.01); *A61F 2002/072* (2013.01); *A61F 2210/0076* (2013.01); *A61F 2220/0075* (2013.01); *A61F 2240/004* (2013.01); *A61F 2250/0039* (2013.01); *A61L 2420/02* (2013.01); *B29K 2027/18* (2013.01); *B29L 2031/7532* (2013.01)

(58) Field of Classification Search
CPC ........ A61F 2210/0076; A61F 2240/004; A61F 2210/0014; A61F 2240/001; A61F 2230/001; A61F 2/86
USPC .......................................................... 623/1.31
See application file for complete search history.

(56) References Cited

U.S. PATENT DOCUMENTS

| | | | | |
|---|---|---|---|---|
| 6,475,232 B1 * | 11/2002 | Babbs | ................. | A61F 2/91 623/1.13 |
| 2004/0044402 A1 * | 3/2004 | Jung | ................. | A61F 2/07 623/1.24 |
| 2005/0197690 A1 * | 9/2005 | Molaei | ................. | A61F 2/86 623/1.13 |
| 2011/0319980 A1 * | 12/2011 | Ryan | ................. | A61F 2/07 623/1.15 |
| 2017/0340460 A1 * | 11/2017 | Rosen | ................. | A61F 2/07 623/1.3 |

FOREIGN PATENT DOCUMENTS

| | | | | |
|---|---|---|---|---|
| KR | 10-2009-0083113 A | 8/2009 | | |
| KR | 10-2010-0090988 A | 8/2010 | | |
| KR | 10-2015-0052719 A | 5/2015 | | |
| KR | 10-1557010 B1 | 10/2015 | | |
| KR | 10-2535728 B1 | 5/2023 | | |
| WO | WO-9628115 A1 * | 9/1996 | ................ | A61F 2/07 |
| WO | WO-0222024 A2 * | 3/2002 | ........ | A61B 17/00234 |
| WO | WO-2008027188 A2 * | 3/2008 | ................ | A61F 2/07 |
| WO | WO-2017093528 A1 * | 6/2017 | ............ | A61F 2/0077 |

* cited by examiner

[FIG. 1]
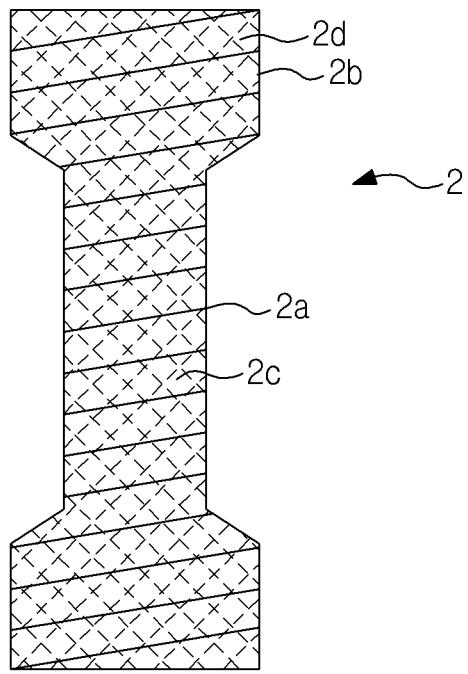
[FIG. 2]
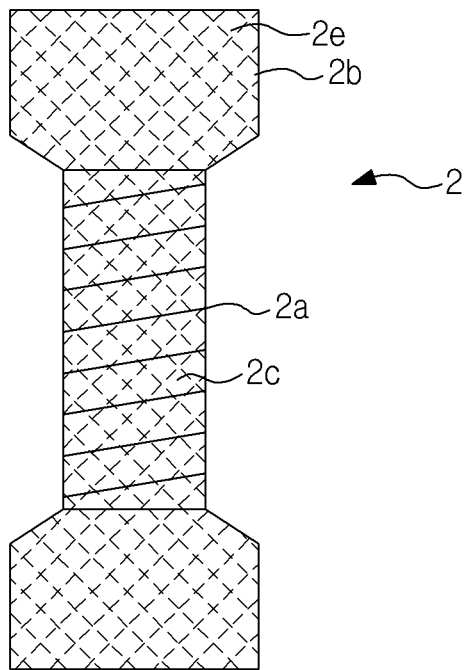

[FIG. 3A]
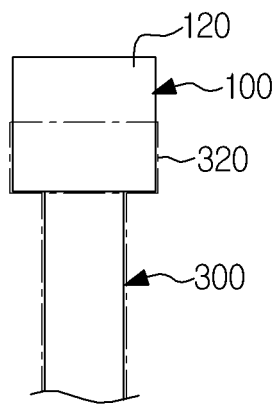
[FIG. 3B]
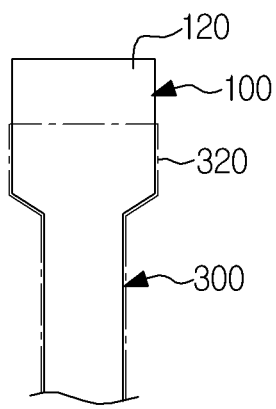
[FIG. 3C]
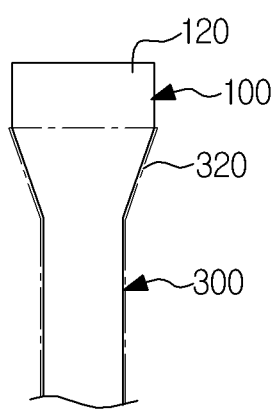

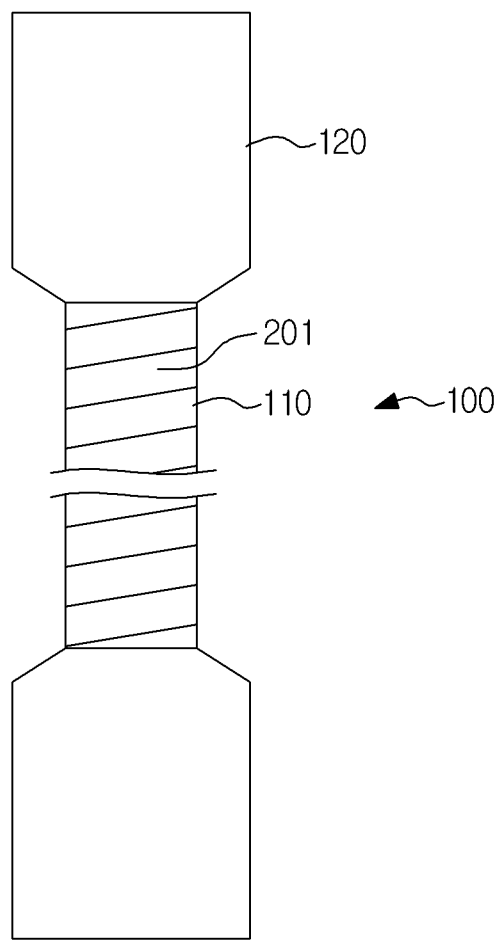
[FIG. 4]

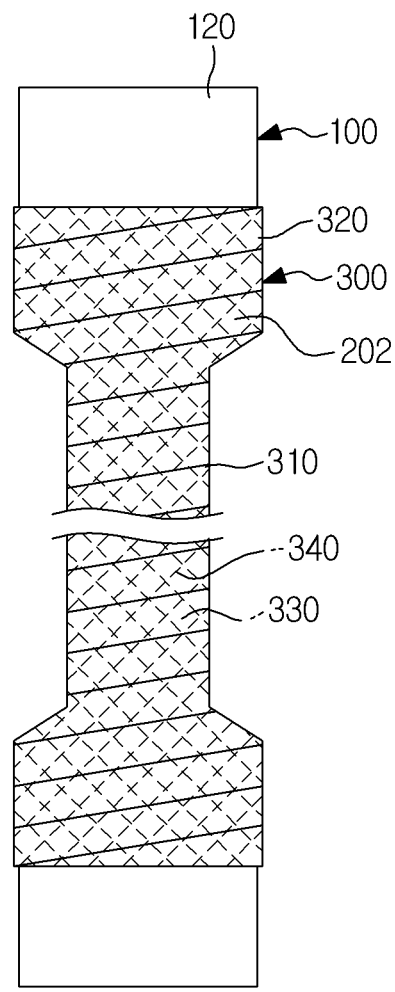
[FIG. 5]

[FIG. 6]
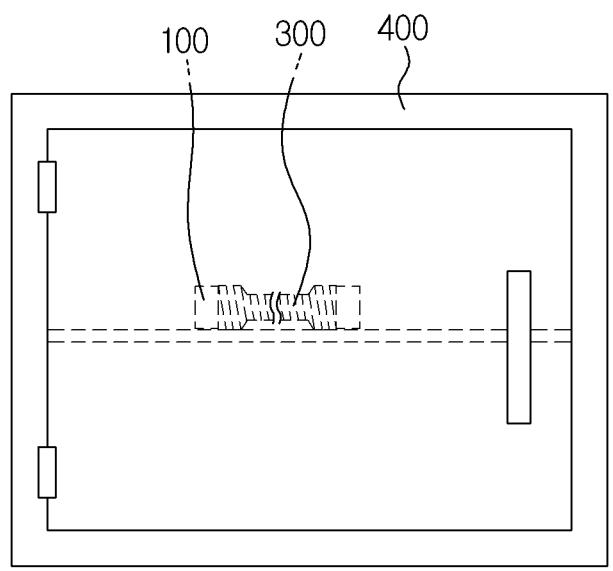
[FIG. 7]
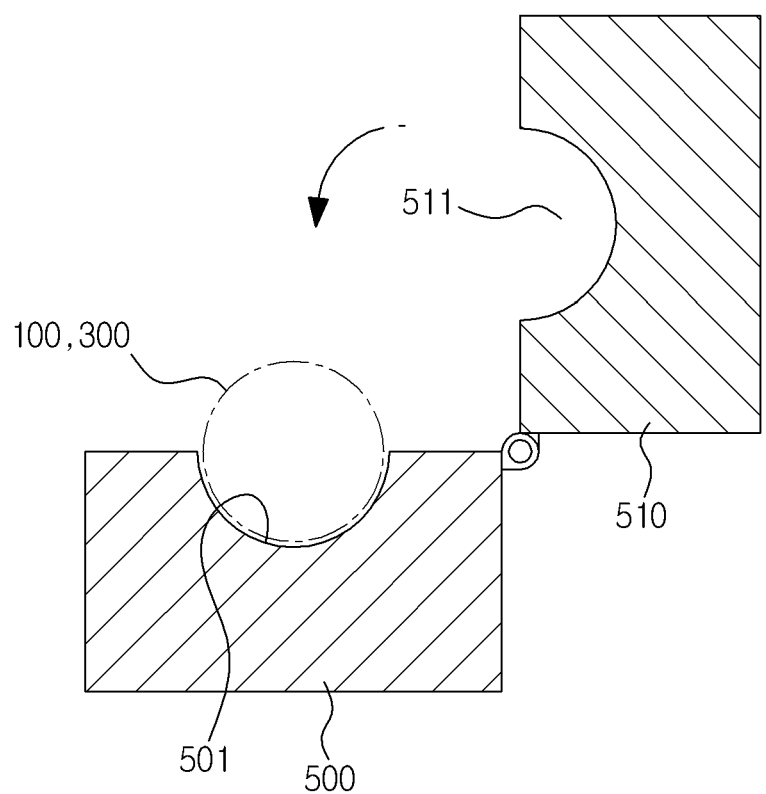

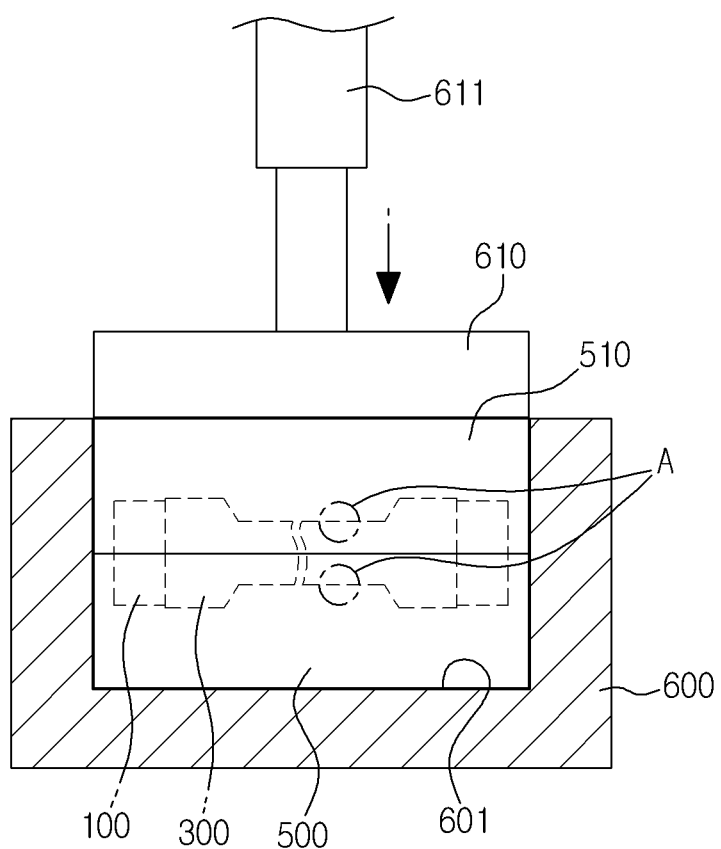
[FIG. 8]

【FIG. 9】
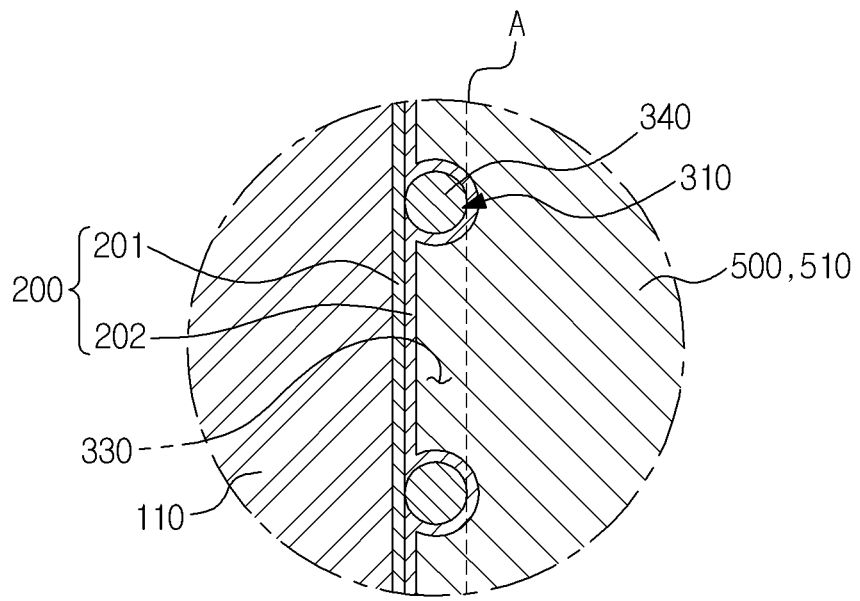
【FIG. 10】
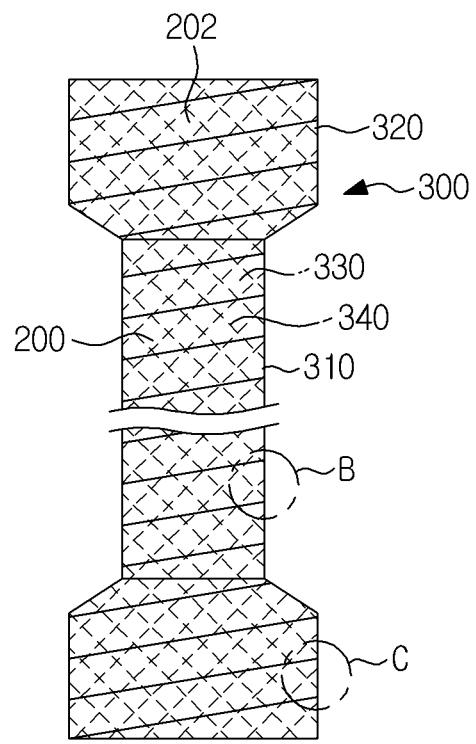

【FIG. 11】
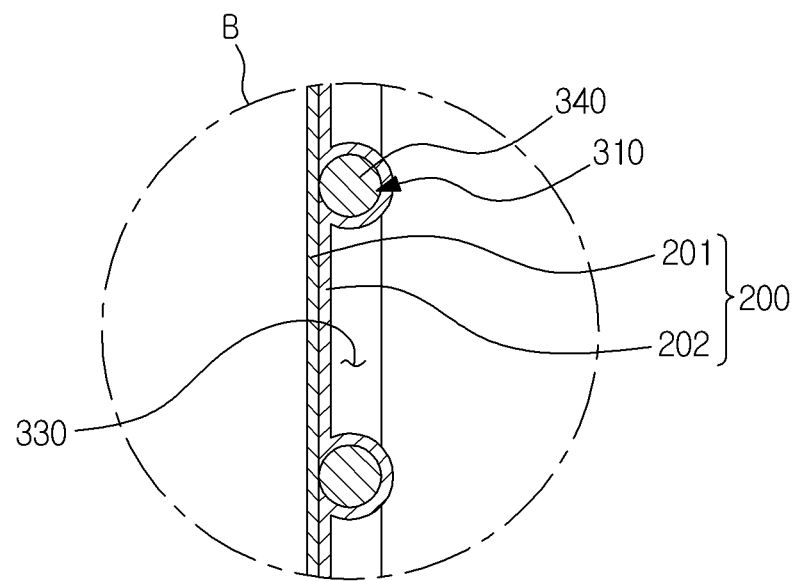
【FIG. 12】
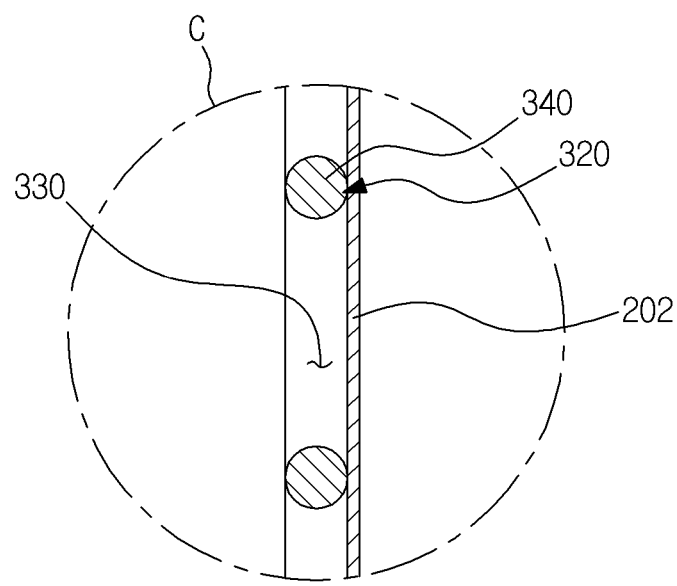

[FIG. 13]
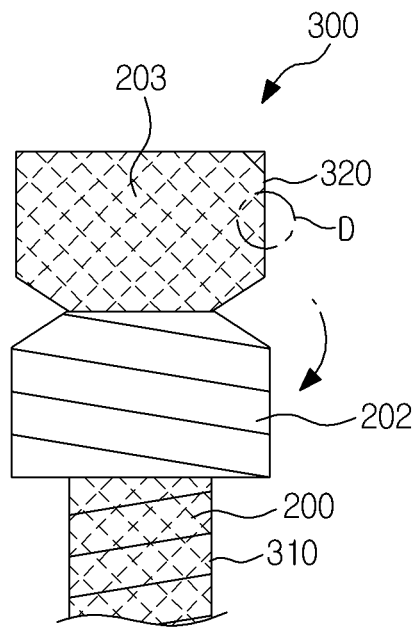
[FIG. 14]
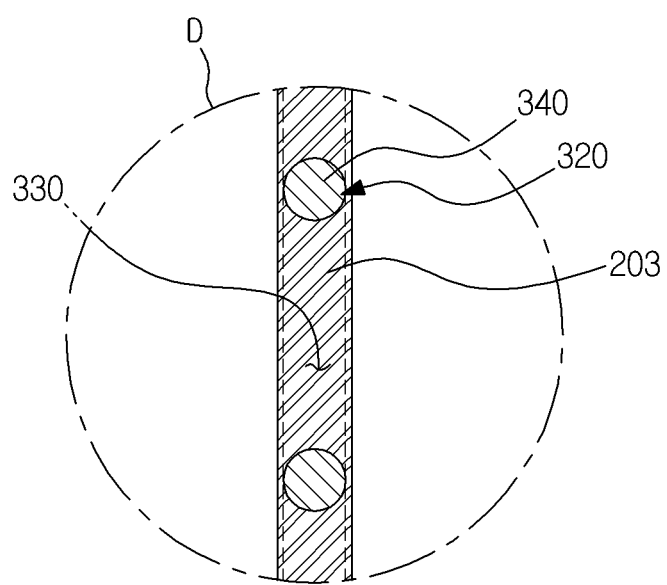

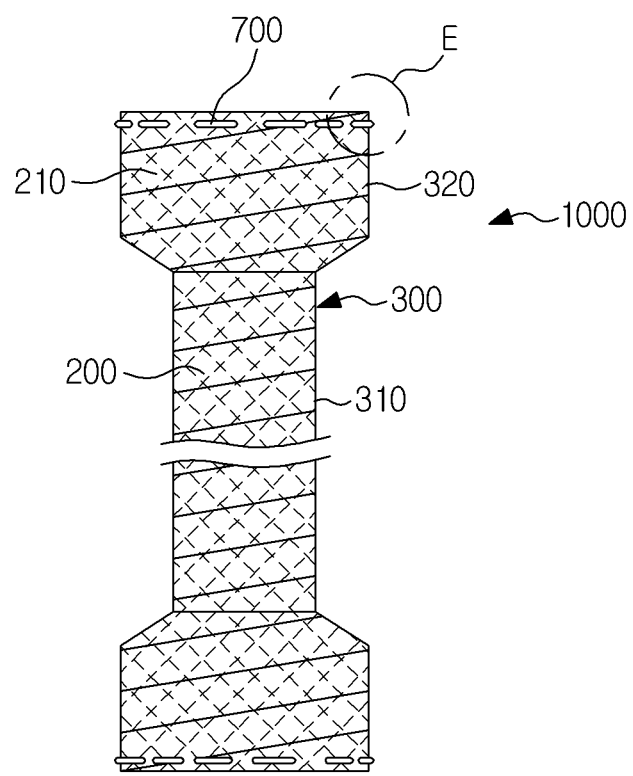
[FIG. 15]

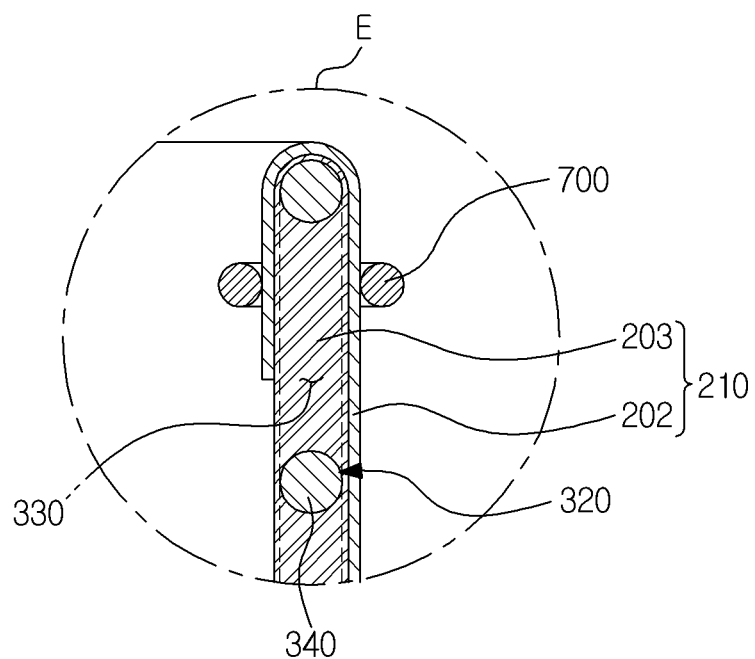
[FIG. 16]

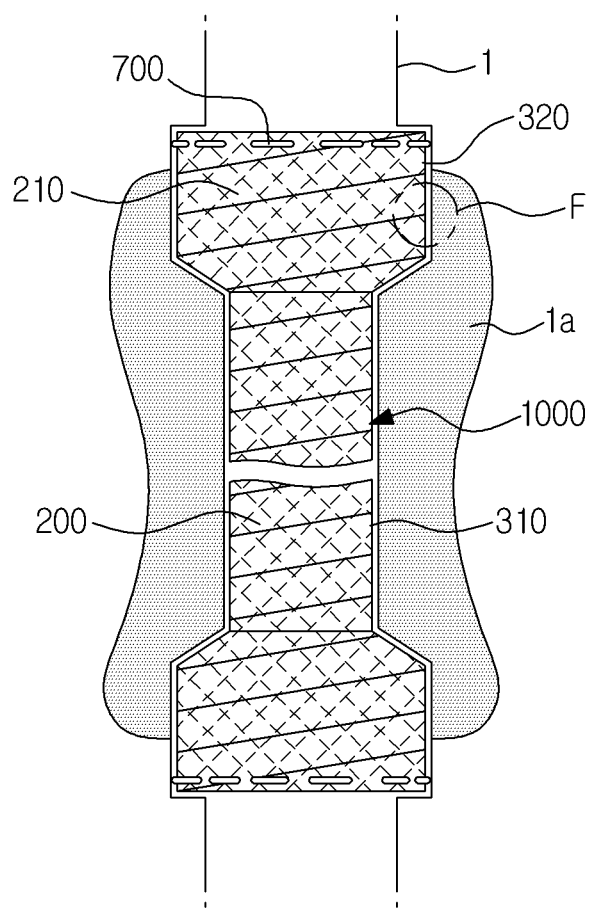

【FIG. 18】
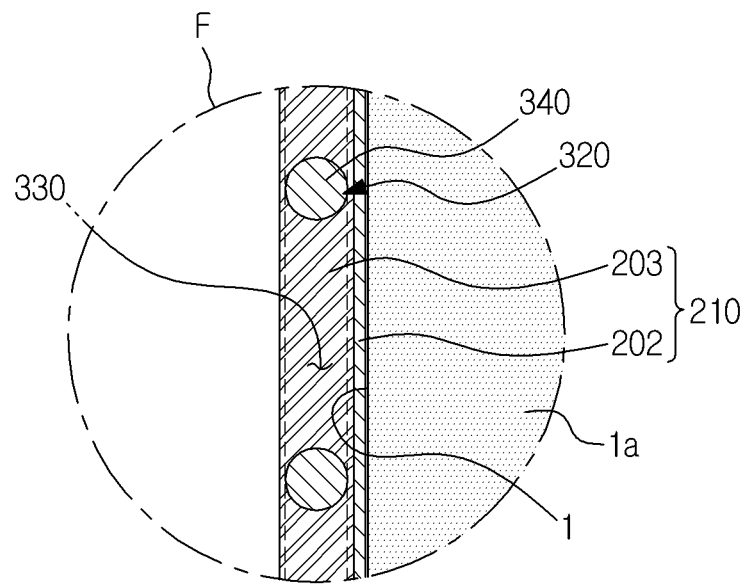
【FIG. 19】
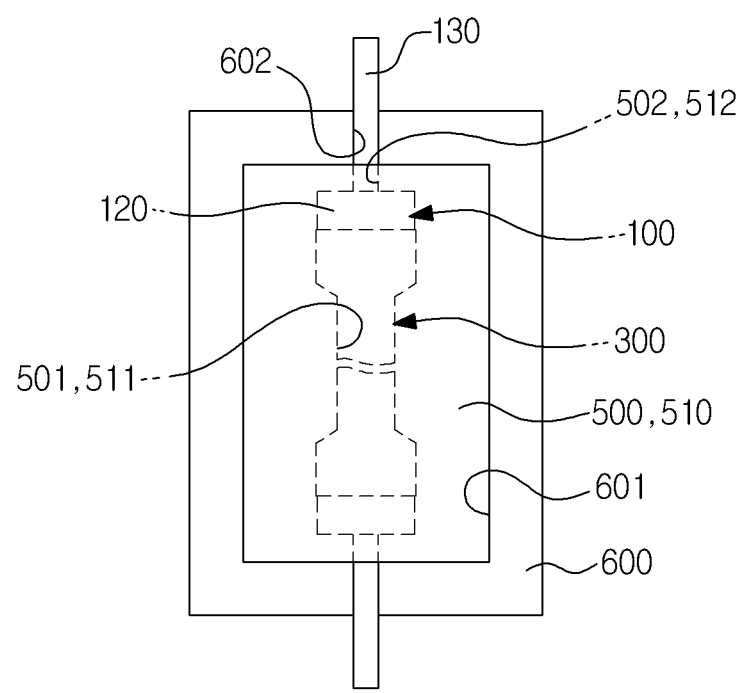

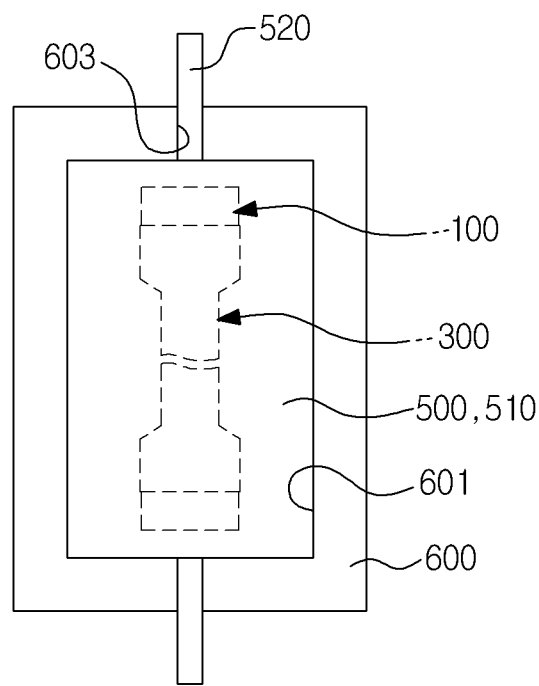

METHOD OF MANUFACTURING COVERED STENT AND COVERED STENT MANUFACTURED THEREBY

CROSS-REFERENCES TO RELATED APPLICATION

The present application claims the benefit of Korean patent application number 10-2021-0064307, filed on May 18, 2021, which is herein incorporated by reference in its entirety.

BACKGROUND OF THE INVENTION

Field of the Invention

The present invention relates to a method of manufacturing a covered stent and a covered stent manufactured thereby, and more particularly to a method of manufacturing a covered stent and a covered stent manufactured thereby in which a PTFE film is formed at a cylindrical body of the stent and another film composed of a PTFE tape and a silicon material is formed at an expansion portion of the stent, which has a diameter greater than that of the cylindrical body.

Description of the Related Art

Generally, when a lesion region occurs in a lumen of a human body, such as a respiratory tract, a throat, a duodenum, a biliary tract, or a urethral canal, and thus causes stenosis or blockage of the lumen due to a tumor or some other causes, the lumen cannot function normally. Hence, it is possible to enable the lumen to function normally by inserting a stent into the lumen having the lesion region to expand the lumen.

In this context, a Patent Document 1 suggests an anti-sliding stent composed of a hollow body in which an upper wire and a lower wire, which are made of a superelastic shape-memory alloy, are diagonally woven with each other from above and below so as to intersect each other to thus define a plurality of diamond-shaped spaces therebetween, wherein the hollow body is provided with engaging protrusions, which are formed by vertically projecting the wire while moving the wire in a diagonal direction, so as to prevent the stent from slipping in a lumen of a human body, the engaging protrusion being formed by vertically projecting the upper wire in a diagonal direction, and wherein the upper wire extends over two or more lower wires such that two or more engaging protrusions are continuously formed.

However, with the invention of Patent Document 1, it is difficult to prevent the stent from slipping and escaping from a lesion region using the engaging protrusions.

Therefore, there is conventionally disclosed a covered stent 2, which includes a cylindrical body 2a and an expansion portion 2b, which is formed at an end of the cylindrical body 2a and has a diameter greater than the cylindrical body 2a so as to be engaged with a lumen of human body including a lesion region, as illustrated in FIGS. 1 and 2.

Here, a PTFE film 2c is formed at the cylindrical body 2a, and a PTFE film 2d or a silicone film 2e is formed at the expansion portion 2b.

However, because this conventional stent is configured such that the stent is inserted into a lumen in the state of being tightly fitted over a catheter of a stent-transferring device, there is a problem in which the PTFE film 2d is stretched outwards.

Hence, when the covered stent 2 is disposed in a lesion region, there is a problem in which the expansion portion 2b cannot be restored to the original position thereof due to the PTFE film 2d which has been stretched.

In other words, because the restoring force of the elasticity of the wire of the expansion portion 2b and the elasticity of the PTFE film 2d alone is in sufficient, it is difficult to restore the expansion portion 2b to the original position.

Hence, there is an event in which the expansion portion 2b slips and escapes from a lumen of a human body due to external force such as shaking of the human body because the expansion portion 2b is not securely engaged with the lumen of the human body.

Furthermore, there is a problem in that, when the covered stent 2, in which the silicone film 2e is formed at the expansion portion 2b, is disposed in a lesion region of a lumen of a human body, the silicone film 2e is brought into contact with and dissolved in body fluids generated in the lumen of the human body.

For these reasons, there is not only the concern that the lesion region is introduced into the spaces in the expansion portion 2b through the damaged silicone film 2e while growing, and thus the cavity in the covered stent 2 is clogged by the grown lesion region, but also the concern that it is difficult to remove the stent 2 from the lumen of the human body when removal or replacement of the stent is intended to be performed after the lapse of a predetermined period of time because the grown lesion region engages with the spaces in the expansion portion 2b.

RELATED ART DOCUMENT

Patent Document 1

Korea Patent Registration Publication No. 10-1657648

SUMMARY OF THE INVENTION

Therefore, the present invention has been made in view of the above problems, and it is an object of the present invention to provide a method of manufacturing a covered stent and a covered stent manufactured thereby in which, when the stent is disposed at a lesion region of a lumen of a human body, an expansion portion thereof, which is in the state of being compressed by a catheter of a stent-transferring device, is more easily restored to the normal position and engaged with the lumen by the elasticity of a film than a conventional stent.

It is another object of the present invention to provide a method of manufacturing a covered stent and a covered stent manufactured thereby, which is capable of preventing a film formed at an expansion portion thereof from being dissolved in body fluids generated from a lumen of a human body.

In accordance with the present invention, the above and other objects can be accomplished by the provision of a method of manufacturing a covered stent including preparing a jig, which is composed of a cylindrical body and an expansion portion, which is formed at one end or both ends of the cylindrical body so as to have a diameter greater than the cylindrical body, winding a first PTFE (polytetrafluoroethylene) tape around an outer surface of the cylindrical body of the jig, inserting the jig into a stent, which is composed of a cylindrical body and an expansion portion, which is formed at one end or both ends of the cylindrical body and has a diameter greater than the cylindrical body, winding a second PTFE (polytetrafluoroethylene) tape around both an outer surface of the cylindrical body and an outer surface of the expansion portion, putting the stent including the jig inserted therein in an oven such that the first and second PTFE tapes are ready to be bonded to each other and taking the stent out of the oven, fitting the jig and the stent, around which the heated first and second PTFE tapes are wound, into a first fitting portion in a lower elastic member, which is formed so as to have the same shape as a portion of the jig, fitting the jig and the stent into a first fitting portion in an upper elastic member, which is formed so as to have the same shape as a remaining portion of the jig, fitting the lower and upper elastic members into a first fitting portion in a mold, which is formed so as to have the same shape as the lower and upper elastic members, pressing the upper elastic member using a press member such that the first and second PTFE tapes are bonded to each other and are charged into spaces in the stent, thereby forming a first film on the cylindrical body of the stent, taking the lower and upper elastic members out of the first fitting portion in the mold while releasing the pressing state of the press member, taking the stent out of the first portion in the lower elastic member and the first fitting portion in the upper elastic member, removing the jig from the stent, inverting a portion of the second PTFE tape that is not secured to the expansion portion of the stent outwards toward the cylindrical body to expose the expansion portion, forming a silicon coating layer at the expansion portion through silicone coating to fill the spaces in the stent with the silicon coating layer, restoring the second PTFE tape to a normal position so as to surround the expansion portion, and sewing the spaces in the expansion portion, the second PTFE tape and the silicon coating layer using a connecting strand to form a second film at the expansion portion of the stent, and a covered stent manufactured thereby.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 are front views illustrating a conventional covered stent;

FIGS. 3A to 3C are front views illustrating various forms of a jig and a stent according to an embodiment of the present invention;

FIGS. 4 to 16 are views illustrating a process of manufacturing the covered stent according to the embodiment of the present invention;

FIGS. 17 and 18 are views illustrating the covered stent according to the embodiment of the present invention which is used in a lumen of a human body;

FIG. 19 is a plan view illustrating upper and lower elastic members and a mold according to another embodiment of the present invention; and FIG. 20 is a plan view illustrating upper and lower elastic members and a mold according to a further embodiment of the present invention.

DETAILED DESCRIPTION OF THE INVENTION

Hereinafter, a method of manufacturing a covered stent according to an embodiment of the present invention will be described in detail with reference to the accompanying drawings.

As illustrated in FIGS. 3A to 18, according to the present invention, a covered stent 1000 is manufactured as follows. A jig 100, which is composed of a cylindrical body 110 and an expansion portion 120, which is formed at one end or both ends of the cylindrical body 110 so as to have a diameter greater than the cylindrical body 110, is first prepared. A taping operation of winding a first PTFE (polytetrafluoroethylene) tape 201 around the outer surface of the cylindrical body 110 is performed.

Here, the expansion portion 120 of the jig 100 may be formed into one of the various forms shown in FIGS. 3A to 3C. Alternatively, the expansion portion 120 may be formed into another form different from the forms shown in FIGS. 3A to 3C.

The jig 100 is made of a metal material. The first PTFE tape 201 is wound around the jig 100 only in a helical direction, only in a circumferential direction, or in both helical and circumferential directions.

Thereafter, the jig 100 is inserted into a stent 300, which is composed of a cylindrical body 310 and an expansion portion 320, which is formed at one end or both ends of the cylindrical body 310 and has a diameter greater than the cylindrical body 310. An operation of winding a second PTFE (polytetrafluoroethylene) tape 202 around both the outer surface of the cylindrical body 310 and the outer surface of the expansion portion 320 is performed.

Here, each of the cylindrical body 310 and the expansion portion 320 of the stent 300 is formed so as to have a hollow pipe form, which is prepared in such a manner as to weave or intersect one or more wires 340, which are made of a superelastic shape memory alloy, in a reticular pattern and into which the jig 100 is inserted. Consequently, the cylindrical body 310 and the expansion portion 320 of the stent 300 are provided in the outer surfaces thereof with a plurality of spaces 330, and the one or more wires 340 comprise a wire structure which continuously extends across the cylindrical body and the expansion portions, as seen in FIG. 10.

Here, the expansion portion 320 of the stent 300 may be formed into one of the various forms shown in FIGS. 3A to 3C. Alternatively, the expansion portion 320 may be formed into another form different from the forms shown in FIGS. 3A to 3C.

The second PTFE tape 202 is wound around the stent 300 only in a helical direction, only in a circumferential direction, or in both helical and circumferential directions.

Subsequently, the stent 300, in which the jig 100 is disposed, is put into an oven 400, and is heated to a temperature at which the first and second PTFE tapes 201 and 202 are easily bonded to each other. Thereafter, the stent 300 is taken out of the oven 400.

Here, the oven 400 heats the stent 300 including the jig 100 fitted therein to 300° C. or higher. When heated to 300° C. or higher, the first and second PTFE tapes 201 and 202 is softened and fused.

Subsequently, the combination of the jig 100 and the stent 300, around which the first and second PTFE tapes 201 and 202 are wound, is fitted into a first fitting portion 501 in a lower elastic member 500, which is formed so as to have the same cross section as that of a portion of the jig 100, and is then fitted into a first fitting portion 511 in an upper elastic member 510, which is formed so as to have the same cross section as that of the remaining portion of the jig 100.

Here, the lower elastic member 500 and the upper elastic member 510 are made of a silicone or rubber material, and are connected to each other via a hinge member.

The first fitting portion 501 in the lower elastic member 500 and the first fitting portion 511 in the upper elastic member 510 are deformably expanded by the thickness of the stent 300.

Subsequently, the lower elastic member 500 and the upper elastic member 510 are fitted into a first fitting portion 601 in a mold 600, which is formed to have the same shape as that of the combination of the lower elastic member 500 and the upper elastic member 510. Then, the upper elastic member 510 is pressed by means of a press member 610 such that the first and second PTFE tapes 201 and 202 are bonded to each other while the spaces 330 are filled with the elastic members, thereby forming a first film 200 on the cylindrical body 310 of the stent 300.

The lower elastic member 500 and the upper elastic member 510, in which the first fitting portions 501 and 511 are deformably expanded by the thickness of the stent 300, are uniformly subjected to pressure from all directions by the first fitting portion 601 in the mold 600 and the press member 610 rather than being unevenly subjected to pressing by one of the first fitting portion 601 in the mold 600 and the press member 610.

Accordingly, the lower elastic member 500 and the upper elastic member 510 uniformly press the jig 100 and the stent 300, around which the first and second PTFE tapes 201 and 202 are respectively wound, using the uniform pressure of the first fitting portion 601 in the mold 600 and the press member 610.

Here, although portions of the lower elastic member 500 and the upper elastic member 510 that are in close contact with the wire 340 of the stent 300 are not deformed, the remaining portions of the lower elastic member 500 and the upper elastic member 510, which are not in close contact with the wire 340 of the stent 300, are deformed and introduced into the spaces 330, thereby pressing the second PTFE tape 202 wound around the stent 300. (FIG. 15 shows an embodiment where connecting strand 700 is sewn only at both axial ends of the expansion portion 320 of stent 300. FIG. 16 shows an embodiment where connecting strand 700 does not directly contact wire 340 in the expansion portion 320 of the stent 300.)

The second PTFE tape 202 wound around the stent 300 is introduced into the spaces 330 and is brought into close contact with and bonded to the first PTFE tape 201, which is wound around the cylindrical body 110, by the pressure of the lower elastic member 500 and the upper elastic member 510.

In other words, the spaces 330 are filled with the elastic members 500 and 510, and the first film 200 is thus formed on the cylindrical body 310.

The press member 610 is connected to a cylinder rod in a cylinder 611, which is hydraulically or pneumatically operated, and is pressed by the cylinder 611.

The mold 600 may be composed of at least two mold parts, which are coupled to each other so as to define the first fitting portion 601 therebetween.

Subsequently, after the pressed state by the press member 610 is released, the lower elastic member 500 and the upper elastic member 510 are taken out of the first fitting portion 601 in the mold 600, the stent 300 is taken out of the first fitting portion 501 in the lower elastic member 500 and the first fitting portion 511 in the upper elastic member 510, and the jig 100 is removed from the stent 300.

Here, the press member 610 is operated to press the upper elastic member 510 and release the pressed state of the upper elastic member 510 by the cylinder 611, which is hydraulically or pneumatically operated.

Meanwhile, the second PTFE tape 202, which is wound around the expansion portion 320, is not introduced into the spaces 330 and is thus not fixed to the expansion portion 320.

Prior to removal of the jig 100 from the stent 300, an operation of cooling the stent 300 and the jig 100 is performed.

The second PTFE tape 202, which is not fixed to the expansion portion 320, is inverted outwards toward the cylindrical body 310 so as to expose the expansion portion 320, and the expansion portion 320 is coated with silicone so as to form a coating layer 203 on the expansion portion 320 while filling the spaces 330 with the silicone.

Here, the silicone coating layer 203 is formed in such a manner as to immerse the expansion portion 320 in silicon solution or to spray silicone to the expansion portion 320.

After the silicone coating layer 203 is formed, an operation of drying the silicone coating layer 203 is performed.

Thereafter, the second PTFE tape 202 is restored so as to surround the expansion portion 320, and the spaces in the expansion portion 320, the second PTFE tape 202 and the silicone coating layer 203 are sewn by a connecting strand 700, thereby completing the formation of the second film 210 on the expansion portion 320. As seen from FIGS. 15 and 16, in the expansion portion 320, the connecting strands 700 do not directly contact wires 340.

As a result, the cylindrical body 310 of the stent 300 is coated with the first film 200, which is composed of the first and second PTFE tapes 201 and 202, and the expansion portion 320 of the stent 300 is coated with the second film 210, which is composed of the second PTFE tape 202 and the silicon coating layer 203, thereby providing the completed covered stent 1000 according to the embodiment of the present invention. FIG. 16 shows, in the expansion portion 320, that the second PTFE tape 202 (which as noted above is part of the first film 200 on the cylindrical body 310) extends over the silicon coating layer 203 and extends completely between the expanded portions 320.

As illustrated in FIGS. 17 and 18, the covered stent 1000 is disposed in a lumen 1 of a human body, through which food, bile, blood, or the like flows, by means of a stent-transferring device in order to expand a lesion region of the lumen 1 of the human body, which is narrowed or blocked.

Here, when the stent 1000 is disposed in the lesion region 1*a*, the expansion portion 320, which is compressed by a catheter of the stent-transferring device, is easily restored to the normal position by the elasticity of the silicone coating layer 203, and is engaged with the wall of the lumen 1 of the human body.

The second PTFE tape 202 of the second film 210 serves to prevent body fluid generated in the lumen 1 of the human body from contacting the silicone coating layer 230.

As illustrated in FIG. 19, the expansion portion 120 according to another embodiment of the present invention is provided with a knob 130 projecting from the outer surface thereof.

Accordingly, the jig 100 and the stent 300 may be taken out of the oven 400 using the knob 130 rather than the heated first and second PTFE tapes 201 and 202.

The lower elastic member 500 and the upper elastic member 510 are respectively provided on the outer surfaces thereof with second fitting portions 502 and 512, which respectively communicate with the first fitting portions 501 and 511 and into which the knob 130 is fitted.

Furthermore, the mold 600 is provided on the outer surface thereof with a second fitting portion 602, which communicates with the first fitting portion 601 and into which the knob 130 is fitted.

Accordingly, by means of the knob 130, the lower elastic member 500 and the upper elastic member 510 are taken out of the first fitting portion 601 in the mold 600, and the stent 300 is taken out of the first fitting portion 501 in the lower elastic member 500 and the first fitting portion 511 in the upper elastic member 510.

As illustrated in FIG. 20, according to a further embodiment of the present invention, the lower elastic member 500 and the upper elastic member 510 are provided with a knob 520 projecting from the outer surface thereof.

Here, the knob 520 projects from one or both of the two outer end surfaces of the combination of the lower elastic member 500 and the upper elastic member 510.

The mold 600 is provided in the outer surface with a third fitting portion 603, which communicates with the first fitting portion 601 and into which the knob 520 is fitted.

Accordingly, the lower elastic member 500 and the upper elastic member 510 are taken out of the first fitting portion 601 in the mold 600 by means of the knob 520.

As is apparent from the above description, the present invention offers an effect of forming the second film on the expansion portion of the stent by sewing the spaces in the expansion portion, the second PTFE tape, and the silicone coating layer using a connecting strand.

In other words, there is an effect of improving the elasticity of the expansion portion of the stent by virtue of the silicone coating layer, which is more elastic than PTFE.

Accordingly, when the stent is disposed in a lesion region of a lumen of a human body, the expansion portion, which is compressed by a catheter of a stent-transferring device, is more easily restored to the normal position than a conventional expansion portion and is stably engaged with the wall of the lumen by virtue of the elasticity of the silicone coating layer of the second film, thereby offering an effect of preventing the stent from sliding and escaping from the lesion region upon application of external force such as shaking of the human body.

Furthermore, the present invention enables the second PTFE tape to be brought into contact with the wall of a lumen of a human body, in place of the silicone coating layer of the second film.

In other words, there is an effect of preventing the silicon coating layer of the second film formed at the expansion portion from being dissolved and thus damaged in human fluid generated from a lumen of a human body compared to a conventional technology.

Accordingly, there is an effect of preventing a growing lesion region from being introduced into the spaces in the expansion portion, thereby preventing the inside of the covered stent from becoming clogged.

In addition, there is an effect of preventing difficulty in removal of the covered stent from a lumen of a human body when the covered stent is replaced or removed after a predetermined period of time because a growing lesion region is engaged with the spaces in the expansion portion, compared to a conventional technology.

Furthermore, there is an effect of making it possible to bond the first and second PTFE tapes to each other by uniformly pressing the upper and lower elastic members by means of the mold and the press member.

Specifically, since the first and second PTFE tapes are more uniformly bonded to each other and are more uniformly charged in the spaces in the stent than a conventional technology, there is an effect of making it possible to stably form the first film on the cylindrical body of the stent.

In other words, there is an effect of preventing the first film made of a PTFE material from being peeled from the cylindrical body of the stent.

Accordingly, there is an effect of preventing a growing lesion region from being introduced into the spaces in the cylindrical body by means of the first film.

In addition, the present invention offers an effect of making it easy to manufacture the upper and lower elastic members because the upper and lower elastic members are made of a silicon or rubber material.

Furthermore, the present invention offers an effect of making it easy to put the stent in the oven, the upper and lower elastic member, and the mold or to take the stent out of the oven, the upper and lower elastic member and the mold because the jig or the upper and lower elastic members are provided with the knob.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A covered stent comprising:
   a cylindrical body and expansion portions comprising a wire structure having wires forming a hollow pipe structure, wherein the expansion portions are disposed at opposite ends of the cylindrical body and have a diameter greater than the cylindrical body, and wherein the wire structure continuously extends across the cylindrical body and the expansion portions;
   a first PTFE (polytetrafluoroethylene) tape;
   a silicone coating layer occupying spaces between the wires of the expansion portions;
   a second PTFE (polytetrafluoroethylene) tape wound on the first PTFE tape and extending over the wires and the silicone coating layer of the expansion portions, wherein the first and second PTFE tapes are bonded to each other, thereby the first and second PTFE tapes comprise a first film on the cylindrical body of the covered stent and extending completely between the expanded portions;
   and
   first and second respective connecting strands sewn circumferentially along first and second circumferences of the expansion portions at opposing axial ends of the covered stent, the first and second respective connecting strands joining together, at the opposing axial ends of the covered stent, the wires to the second PTFE tape and the silicone coating layer,
   wherein
   the second PTFE tape and the silicone coating layer comprise a second film on the expansion portions of the covered stent, and
   at least one outermost wire of the wires of the covered stent is disposed outwardly from at least one of the first and second connecting strands.

2. The covered stent according to claim 1, wherein at least one of the first and second connecting strands contacts the second PTFE tape.

3. The covered stent according to claim 1, wherein at least one of the first and second connecting strands is sewn in and out of an interior of the covered stent and does not directly contact the wires in the expansion portions of the covered stent.

4. The covered stent according to claim 1, wherein at least one of the first and second connecting strands loops through the second PTFE tape and the silicone coating layer.

5. The covered stent according to claim 1, wherein a loop of one of the first and second connecting strands is disposed between the wires of the covered stent in the expansion portions of the covered stent.

6. The covered stent according to claim 1, wherein the wires at the opposing axial ends of the covered stent are covered with the second PTFE tape.

7. The covered stent according to claim 1, wherein at least one of the first and second connecting strands penetrates into a material of the second PTFE tape.

8. The covered stent according to claim 1, wherein at least one of the first and second connecting strands penetrates into a material of the silicone coating layer.

9. The covered stent according to claim 1, wherein both the first and second connecting strands are sewn in and out of an interior of the covered stent only at the opposing axial ends of the covered stent.

10. The covered stent according to claim 1, wherein the first and second PTFE tapes are press-bonded to each other and uniformly fill spaces between the wires of the covered stent.

11. The covered stent according to claim 1, wherein
   a length of the second PTFE tape wraps overs an end of at least one of the expansion portions, and
   at least one of the first and second connecting strands sewn in and out of an interior of the covered stent secures the length of the second PTFE tape, that wraps overs the end at least one of the expansion portions, to the covered stent.

* * * * *